Nov. 9, 1948.  G. E. BURKS  2,453,360
BEARING MOUNTING FOR DRIVE SPROCKETS
OF TRACK TYPE TRACTORS
Filed June 20, 1945  3 Sheets-Sheet 3

INVENTOR.
BY  George E. Burks
Charles M. Fryer
ATTORNEY.

Patented Nov. 9, 1948

2,453,360

UNITED STATES PATENT OFFICE 2,453,360

BEARING MOUNTING FOR DRIVE SPROCKETS OF TRACK TYPE TRACTORS

George E. Burks, Peoria, Ill., assignor to Caterpillar Tractor Co., San Leandro, Calif., a corporation of California Application June 20, 1945, Serial No. 600,530

6 Claims. (Cl. 180—9.1)

The present invention relates to bearing mountings and particularly to the mounting for a bearing used in conjunction with a non-rotatable shaft and a quill shaft supported for rotation thereabout as is common practice in the driving mechanism of certain track type tractors.

While this invention may be employed to advantage in many fields, it is particularly useful in conjunction with driving assemblies for track type tractors of the kind generally illustrated in Patent No. 2,022,651 for "Tractor," issued to Harmond S. Eberhard on December 3, 1935. The assembly shown in said patent is one in which a track driving sprocket is mounted on a quill driven by the power unit of the tractor and supported for rotation relative to a rigid and non-rotatable sprocket shaft.

The invention is particularly concerned with the problem of such sprocket shaft being bent in operation. Bending of the shafts occurs due to strains some of which are caused when dirt, gravel or other materials in which the tractor operates become lodged between the teeth of the sprocket and the track which is driven by it.

One of the objects of the present invention therefore is the provision of a bearing mounting for a quill shaft of the kind described in which a minimum or no bending strain can be imparted to its supporting shaft.

A further object of the invention is the provision of a bearing mounting for the driving sprocket of a track type tractor which is simple and durable in construction and will avoid bending of the main sprocket shaft when it is subjected to unusually heavy strains such as are occasioned by the presence of foreign matter between the sprocket and the track of the tractor. Further and more specific objects and advantages of the invention will become apparent from an understanding of the same as it is described in the following specification with reference to the accompanying drawings.

Figure 1:
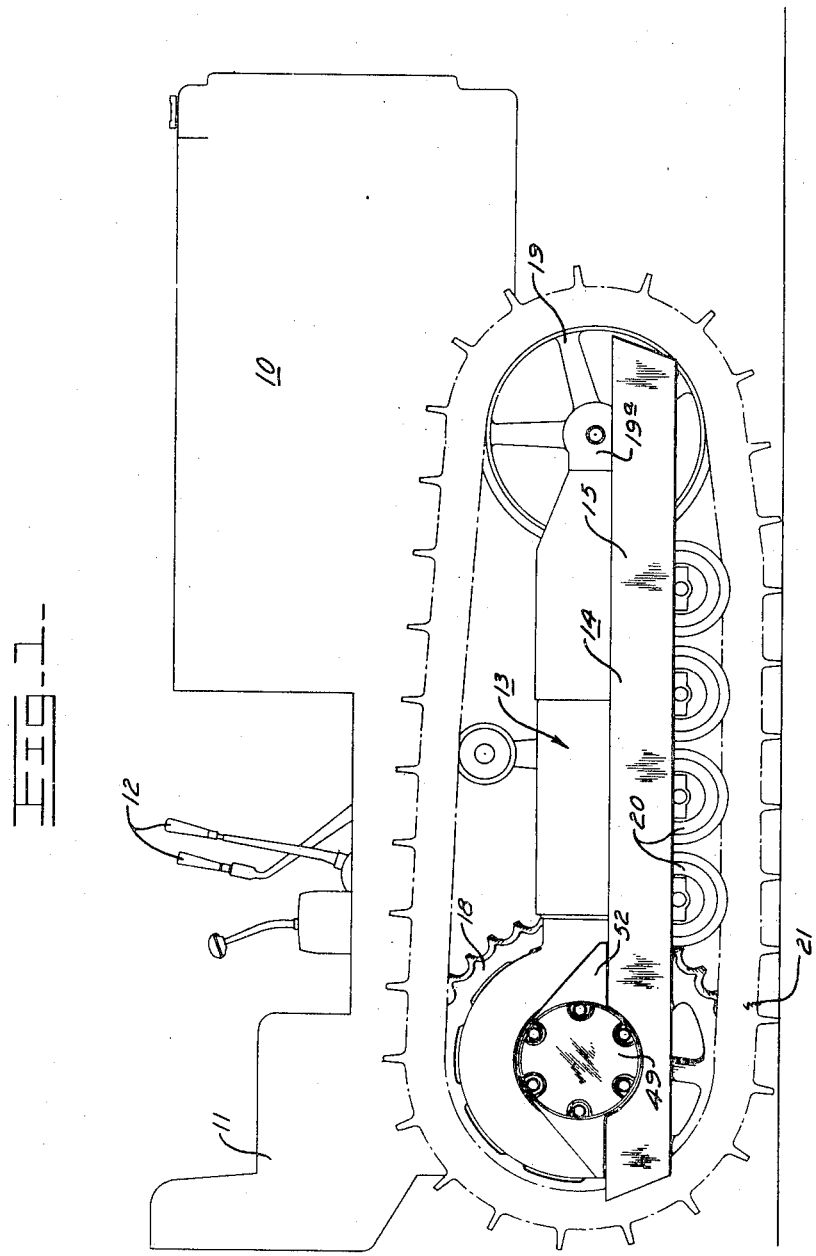
Fig. 1 is a view in side elevation of a track type tractor illustrating particularly the relationship to the tractor of the driving mechanism which embodies the present invention.

In Fig. 1 a track type tractor is illustrated as having a power plant 10, an operator's station 11, controls 12, and a track assembly generally represented by the numeral 13. The track assembly 13 comprises a truck frame 14 which includes an outer channel member 15 and an inner channel member 16, shown in Fig. 2. The rear of the truck frame 14 is shown as pivotally supported, by means presently to be described in detail, about a sprocket shaft 17 which is anchored at its inner end to a bracket 17a and about which a driving sprocket 18 rotates. The sprocket 18 drives a track shown at 21 in Fig. 1 in a well known manner, which track rides over an idler 19 positioned adjacent the front end of the truck frame and supported for rotation in a bearing 19a which is slidable longitudinally of the frame. A spring 22 bears against the idler bearing at one end and is secured to the truck frame at its opposite end and is tensioned to maintain the track taut about the sprocket and idler but to permit slight rearward movement of the idler to relieve unusual strains imposed thereon. Rollers shown at 20 ride on the track 21 as the tractor is advanced by rotation of the sprocket 18.

Figure 2:
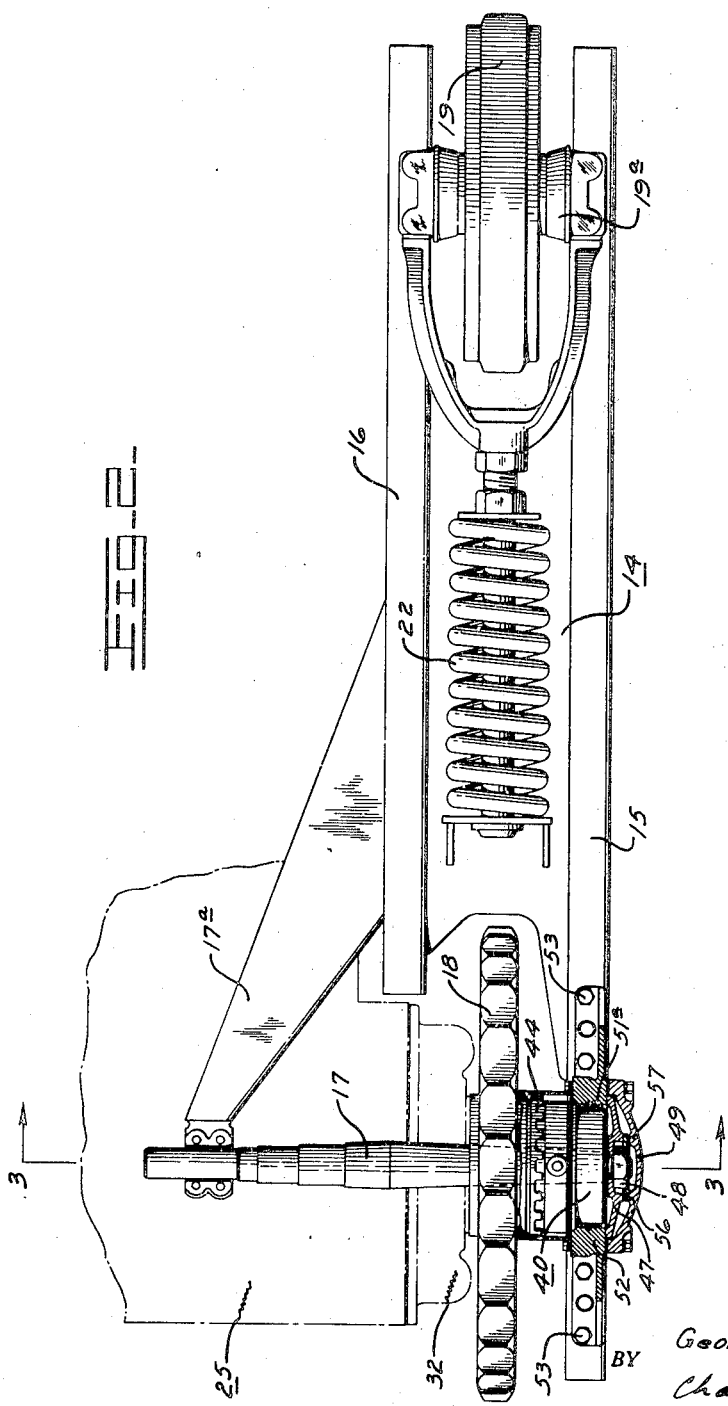
Fig. 2 is a plan view, with parts shown in section, of the right hand track assembly of the tractor shown in Fig. 1.
Figure 3:
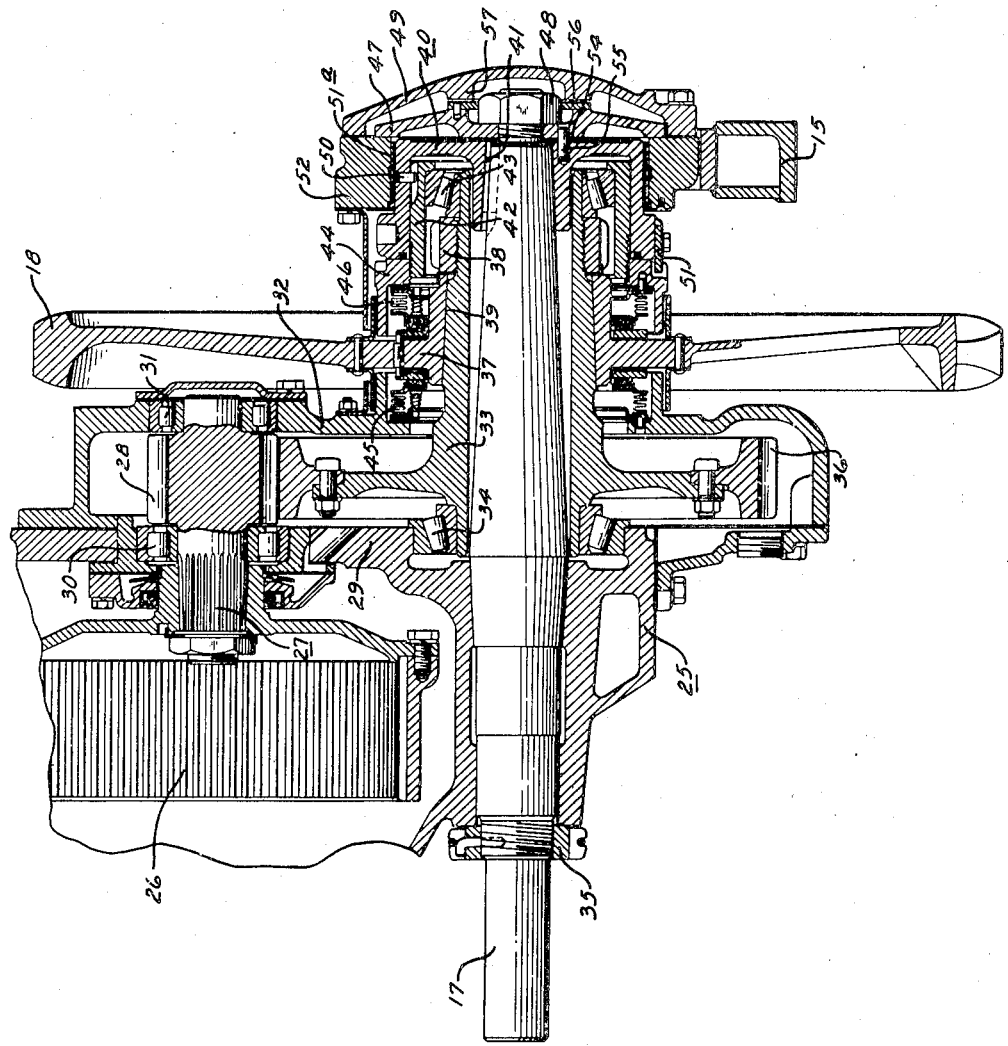
Fig. 3 is a vertical transverse sectional view taken on the line 3—3 of Fig. 2 and showing in detail the bearing mounting of the present invention as applied to the driving mechanism disclosed.

A final drive housing shown at 25 in Fig. 2 is rigidly connected with the transmission case, not shown, and a gear clutch member 26 is fastened as shown in Fig. 3 to a short shaft 27 which carries a pinion 28. A wall 29 of the housing 25 is apertured to receive the shaft 27 and a suitable bearing 30 therefor. A second bearing 31 may be located in a cover member 32 rigidly secured to the housing 25.

In Fig. 3 the sprocket shaft 17 is shown as extending through a portion of the housing 25 and as rigidly secured therein by a nut 35 which draws a tapered portion of the shaft into a complementary tapered socket. A quill 33 is disposed concentrically and out of contact with the shaft 17 and is supported at one end by a bearing 34 located in a suitable recess in the wall 29 of the housing 25. This quill 33 carries a gear 36 which meshes with and is rotated by the pinion 28. The sprocket wheel 18 is also carried by the quill 33 and has a tapered hub portion 37 fitting a tapered and preferably splined surface 39 on the quill.

A bearing cage holder 40 is mounted on the end of the shaft 17 and held against rotation thereon by a key 41. The holder 40 receives a supporting collar 42 which carries a bearing 43 which cooperates with the bearing 34 in supporting the quill 33 for rotation concentrically of the shaft 17. A nut 44 is threaded to a projecting end of the support 42 and engages an end of the holder 40 to effect proper positioning of the bearing 43. A pin 50 carried by the holder 40 projects into a grove, as shown, in the support 42 to prevent rotation of the support but to permit it to move endwise upon rotation of the nut 44. A key 51 is provided for locking the nut 44 against rotation after it has been properly adjusted.

To prevent the escape of oil from the area of the bearing and also to prevent the admission of foreign matter thereto, a seal of conventional construction, as shown at 45, is placed between the sprocket 18 and cover 32, and a similar seal 46 occupies a position between the sprocket and the nut 44. Overlapping shields may be provided as shown exteriorly of the seals 45 and 46 to protect them from damage.

The holder 40 is held against endwise displacement on the tapered end of the shaft 17 by a washer 47 and nut 48 which are enclosed and protected by a cap 49. A bushing 51a embraces the holder 40 and forms a bearing connection between the exterior periphery of the holder and a bracket shown at 52 which is secured, as by cap screws 53, to the channel member 15 of the truck frame 14. This bearing connection permits the truck frame to pivot relative to the shaft 17 so that the track assembly can swing upwardly and at its forward end as the tractor passes over obstacles or uneven ground. The washer member 47 contacts the bearing member 52 and through such contact therewith locates the truck frame longitudinally of the shaft 17. The position of the truck frame with relation to the shaft may be accurately established through shims 54 which are disposed between the washer 47 and the bearing holder cage 40. This adjustment makes it possible to align the entire truck frame assembly with relation to the sprocket 18. A pin 55 is carried by the washer 47 and projects into the member 40 to prevent relative rotation of said parts. Rotation of the nut 48 which holds the washer in place is prevented by a locking plate 56 which has a hexagonal opening to embrace the nut and which is locked against rotation by a pin as shown which projects into the washer 47. The cap 49 is provided with an inwardly projecting annulus 57 positioned for abutment with the outer surface of the washer 56 in order to prevent inward movement of the truck frame longitudinally of the shaft 17.

With the construction shown, any strain imposed on the sprocket 18 and its supporting quill 33, such as might be caused by the inclusion of foreign matter between the teeth of the sprocket and the track, will be imparted to the bearings 34 and 43 which support the quill. As the bearing 43 is disposed in radial alignment with the bearing 51a between the holder 40 and the member 52, such force will be absorbed by the latter member without imparting a bending stress to the shaft 17. In previous structures the outer supporting bearing of the quill, comparable to the bearing 43 here shown, was disposed inwardly of the outermost bearing point of the shaft 17 with the consequence that unusual forces such as those described would tend to bend the shaft 17 adjacent its outer end and a bend in this shaft results in misalignment of the bearings and gears which produces unnecessary friction and rapid wear. With the construction of the present invention, the outer end of the sprocket shaft 17 and the outer end of the quill 33 are supported substantially in the same plane transversely to the axis of the shaft so that forces imparted to the shaft through the quill bearings have no bending moment against which to act and therefore bending of the sprocket shaft and consequent misalignment of its associated parts is avoided.

I claim:

1. In combination with a shaft and a quill surrounding the shaft for rotation in spaced relation thereto, a bearing holder on an end of the shaft having a recess to receive a quill bearing and the corresponding end of the quill, means to support said bearing holder, said support means and quill bearing being substantially aligned in a plane transverse to the axis of the shaft whereby forces absorbed by the quill bearing will be transmitted to the shaft at its point of support by said bearing holder.

2. In a tractor having a housing and a truck frame, a shaft positioned between the housing and the frame, means providing a pivotal support for the frame about the shaft and including a recessed member secured to the shaft with an outer bearing surface, a driving unit including a quill surrounding the shaft, a bearing between the quill and the housing, and a second bearing between the quill and the inner portion of said recessed member in line with said outer bearing surface.

3. In a tractor having a housing and a truck frame, a shaft supported by the housing at its inner end and pivotally connected with the truck frame at its outer end by means of a recessed member secured to and surrounding the shaft, a driving unit comprising a quill surrounding the shaft and carrying a driving sprocket, bearings supporting the quill for rotation relative to the shaft, and a support for one of said bearings disposed within said recessed member in radial alignment with the pivotal connection between the shaft and the truck frame.

4. In combination with a shaft and a surrounding quill supported for rotation with relation thereto, a support for one end of the shaft including a member having an outer supported surface, said member engaging the shaft end and having a recess for reception of the corresponding quill end, and a bearing for the quill disposed within said member and in radial alignment with the supported surface thereof.

5. In combination with a shaft and a quill surrounding the shaft for rotation in spaced relation thereto, a support including a member having an outer supported surface, said member receiving an end of the shaft and recessed to receive the corresponding end of the quill, and a bearing for the quill disposed within the recess of said member and in radial alignment with its shaft supported surface.

6. In drive mechanism for a tractor having a housing and a truck frame, a shaft positioned between the housing and the truck frame, means providing a pivotal support for the frame about the shaft, a driving unit including a quill surrounding the shaft and a sprocket on the quill, a bearing for one end of the quill between the quill and the housing, and a second bearing for the other end of the quill between the quill and said pivotal support, said pivotal support providing an outer surface for pivotal contact with said truck frame, a recess for receiving said second bearing in substantial radial alignment with said pivotal contact surface, and a central inner portion for receiving the shaft.

GEORGE E. BURKS.

REFERENCES CITED

The following references are of record in the file of this patent:

UNITED STATES PATENTS

| Number | Name | Date |
|---|---|---|
| 2,022,651 | Eberhard | Dec. 3, 1935 |
| 2,391,002 | Baker et al. | Dec. 18, 1945 |